US005721616A

United States Patent [19]
Domenicali

[11] Patent Number: 5,721,616
[45] Date of Patent: Feb. 24, 1998

[54] TILT FREE MICROMOTION TRANSLATOR

[75] Inventor: Peter Domenicali, Montpelier, Vt.

[73] Assignee: Zygo Corporation, Middlefield, Conn.

[21] Appl. No.: 646,126

[22] Filed: Apr. 24, 1996

[51] Int. Cl.[6] .................................. G01B 9/02
[52] U.S. Cl. ................................ 356/345; 356/346
[58] Field of Search .............................. 356/345, 346

[56] References Cited

U.S. PATENT DOCUMENTS

| 3,694,088 | 9/1972 | Gallagher et al. |
| 4,225,240 | 9/1980 | Bacasubramanian |
| 4,577,131 | 3/1986 | Soobitsky |
| 4,884,003 | 11/1989 | Hayes |
| 5,239,361 | 8/1993 | Burch ........................ 356/345 |

OTHER PUBLICATIONS

R.V. Jones, "Instruments and Experiences: Papers on Measurement & Instrument Design", pp. 87–144 (John Wiley & Sons, 1988).
J.H. Bruning, et al, "Digital Wavefront Measuring Interferometer For Testing Optical Surfaces & Lenses", pp. 2693–2703 (Applied Optics, vol. 13, No. 11, Nov. 1974).
M. Schaham, "Precision Optical Wavefront Measurement", pp. 183–191 (SPIE vol. 306, Contemporary Methods of Optical Fabrication, 1981).
H.Z. Hu, "Polarization Heterodyne Interferometry Using a Simple Rotating Analyzer 1: Theory and Error Analysis", pp. 2052–2056, Applied Optics) vol. 22, No. 13, Jul. 1983.

Primary Examiner—Frank G. Font
Assistant Examiner—Robert Kim
Attorney, Agent, or Firm—Bryan Cave LLP

[57] ABSTRACT

An apparatus for providing tilt-free, linear micromotion translation of an object (12), such as an optical element, relative to a fixed rigid frame member (2) includes a flexural suspension (7) connected to the object (12) for enabling motion of the object (12) along a predetermined translational axis (18). The flexural suspension (7) includes a plurality of flexural links (14, 15) connecting a plurality of points (9) on the fixed rigid frame member (2) to a plurality of points (10) on a moving rigid frame member (11) with the links (14, 15) and the points (9, 10) connected by the links (14, 15) lying in a pair of parallel planes with an arrangement of links (14, 15) and fixed (9) and moving (10) points being disposed in each of the parallel planes and with the translational axis (18) being normal to the pair of parallel planes. The arrangements of the fixed (9) and moving (10) points are, disposed in the parallel planes for minimizing any undesirable cross axis translational motions (16, 17, 18) of the object (12). The apparatus also includes a linear motion transducer (32) and a drive mechanism (31) coupling linear motion transducer (32) to the flexural suspension (7) for enabling the tilt-free, linear micromotion translation of the object (12).

16 Claims, 5 Drawing Sheets (Front View)

(Side View)

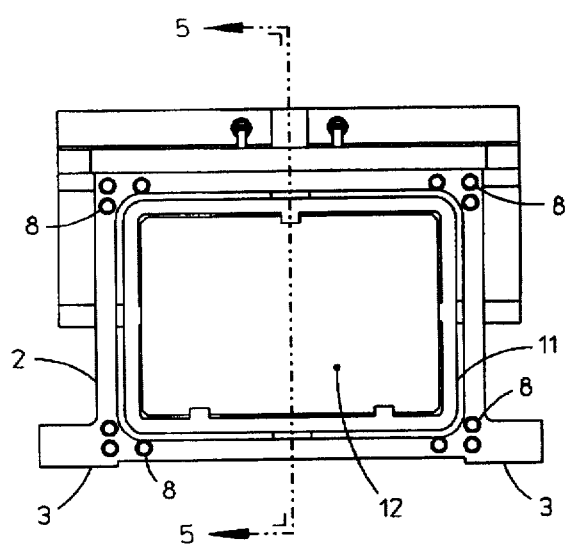
Figure 1A (Front View)
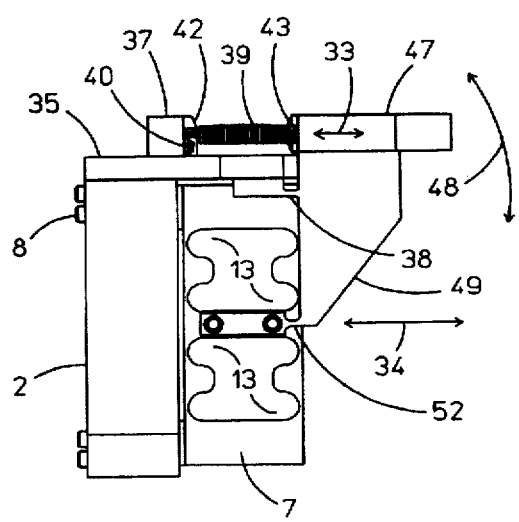
Figure 1B (Side View)

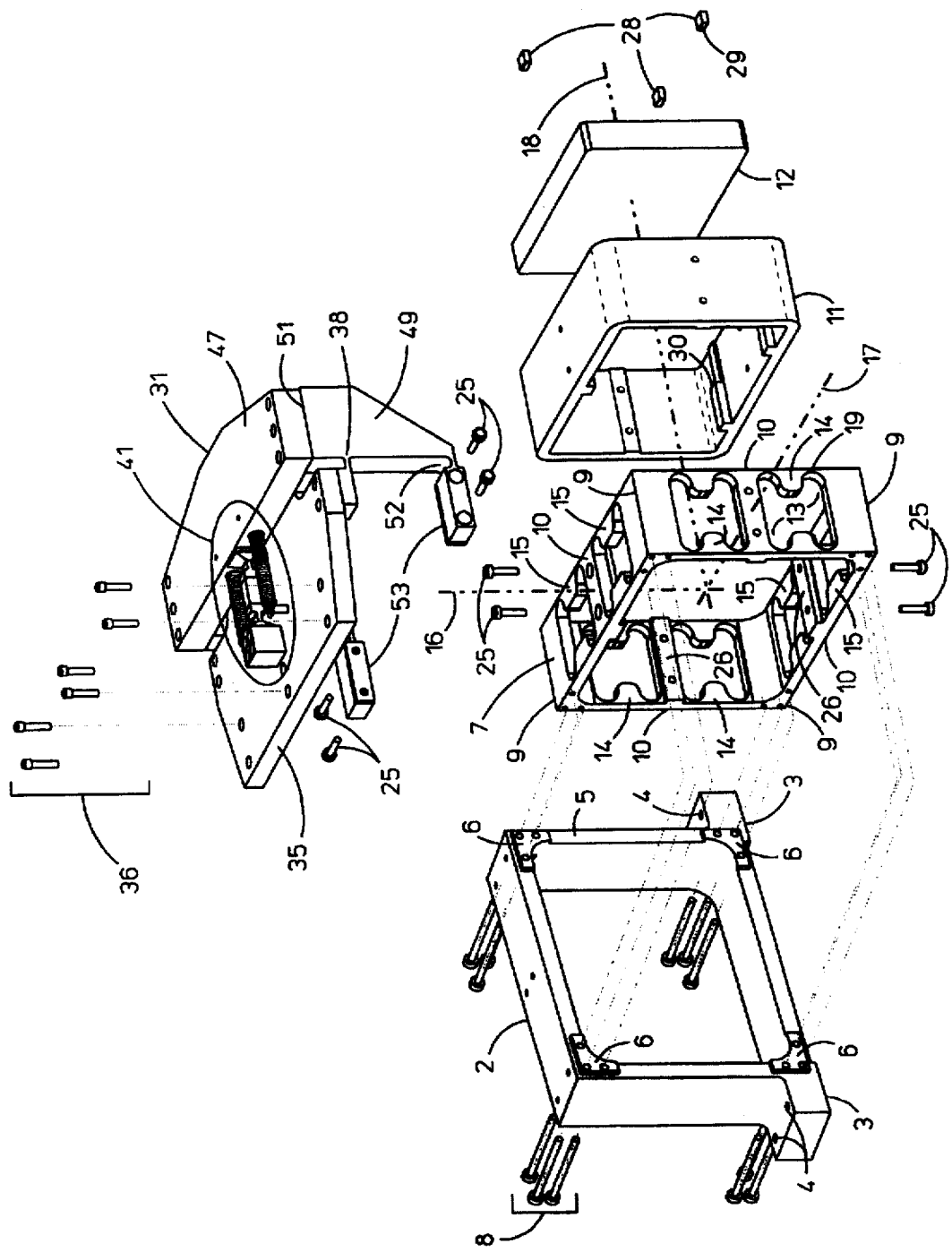
Figure 2 (Exploded View)

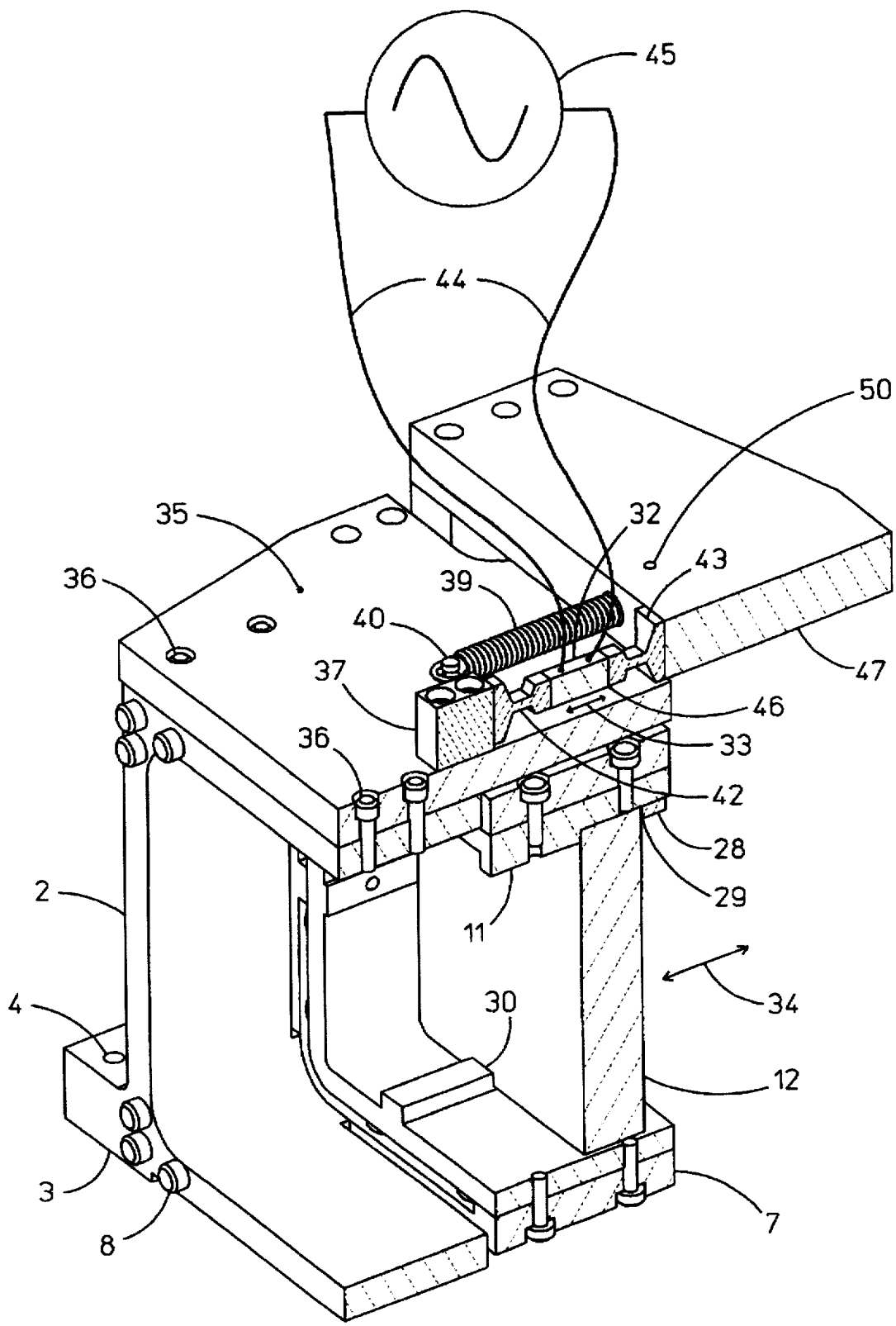
Figure 5 (Sectional View)

TILT FREE MICROMOTION TRANSLATOR

CROSS-REFERENCE TO RELATED APPLICATIONS

This application is related to commonly owned U.S. patent application Ser. No. 08/334,939, filed Nov. 7, 1994 and Ser. No. 08/365,589 filed Dec. 28, 1994, both entitled "Method and Apparatus for Profiling Surfaces Using Diffractive Optics".

BACKGROUND OF THE INVENTION

1. Field of the Invention

The present invention relates to an apparatus which provides precise, tilt-free, linear translation of an object relative to a fixed member. More particularly, the present invention relates to apparatus for use in optical interferometers for the purpose of rapidly and accurately measuring the shape of surfaces.

2. Description of the Prior Art

Phase measuring interferometry provides the optical path difference between the two wavefronts of the interferometer at each resolution element while phase modulating the interference pattern: see, for example, J. H. Bruning, et. al., "Digital Wavefront Measuring Interferometer for Testing Optical Surfaces and Lenses," Applied Optics, Vol.13, pp.2693–2703 (1974); Gallagher, et. al., U.S. Pat. No. 3,694,088 issued Sep. 26, 1972; N. Balasubramanian, U.S. Pat. No. 4,225,240 issued Sep. 30, 1980: M. Schaham, Proceedings SPIE, Vol. 306, pp. 183–191 (1981); and H. Z. Hu, "Polarization Heterodyne Interferometry using a Simple Rotating Analyzer. 1. Theory and Error Analysis," Applied Optics, Vol. 22, pp 2052–2056(1083).

To accomplish the phase modulation in many types of prior art phase measuring interferometers, it is necessary to provide tilt-free linear translation of an optical element through a distance equal to approximately one to two wavelengths of the light used, i.e. by way of example, approximately one micrometer. Various prior art PZT actuated micromotion translators, are described for example, in commonly owned U.S. Pat. No. 4,577,131, issued Mar. 18, 1986, and U.S. Pat. No. 4,884,003, issued Nov. 28, 1989. In addition, Instruments and Experiences, Papers on Measurement and Instrument Design, by R. V. Jones, John Wiley & Sons, pp 87–144, 1988 provides a general discussion of the use of flexures for precision motion applications. While these prior art translators may be useful for some applications, they are not useful in interferometers having a long equivalent wavelength, such as e.g. 12.5 micrometers or greater. In addition, the prior art translators known to applicant use multiple PZT elements, thereby, increasing their cost and complexity.

While prior art phase modulation translators are useful for some applications, there is presently an unmet need for a translator which provides linear, tilt-free translation of an object over a range of ten or more micrometers. These disadvantages of the prior art are overcome by the present invention.

SUMMARY OF THE INVENTION

The present invention provides an apparatus and method for controlling the position of an object along one translational axis, while minimizing all other translational and rotational motions of the object, using a single driving element for the motion input. A flexural suspension allows motion of the object along the desired translational axis, while a drive mechanism couples a single linear motion transducer to the flexural suspension to produce the desired motion of the object. The flexural suspension uses multiple flexural links connecting multiple points on a fixed rigid frame to multiple points on a moving rigid frame. The links and the points connected by them lie in two parallel planes, with identical arrangements of links and fixed and moving points in both planes. The axis of the desired translational motion is normal to these planes. The arrangement of the fixed and moving points has been chosen so as to take advantage of symmetry to minimize the undesired cross-axis translational motions of the object. In either of the two planes, four fixed points are arranged at the corners of a rectangle, and four moving points are arranged at the midpoints of the four sides of that rectangle There are then four pairs of flexural links, so that each pair joins a moving point to its two neighboring fixed points and forms one side of the rectangle.

Each flexural link consists of a rigid beam with a flexural hinge joint at each end. A flexural link allows relatively unrestricted motion perpendicular to the link (limited by the flexibility of the hinge), while essentially preventing motion parallel to the length of the link.

The rectangular arrangement of the links allows the suspension to fit closely to a rectangular object, such as a mirror or other optical element, reducing the overall size of the suspension. It also simplifies the machining of the flexures from a single piece of stock, which reduces the cost of the suspension.

The drive mechanism includes an apparatus and method for controlling the position of the suspended object along the desired translational axis. The elongation of a single linear motion transducer (such as a piezoelectric displacement transducer) is converted to two equal motions driving the suspended object at two locations symmetrically arranged about its geometric center or its center of mass. The transducer acts at a center point of a rigid beam, causing the entire beam to translate in a direction perpendicular to its length. The two ends of this beam are attached to two identical levers. Each lever is attached to a fixed "fulcrum" point by means of a flexural hinge, located part way along the length of the lever. The opposite end of each lever is attached to a moving point of the flexural suspension, by means of an additional flexural hinge. These four flexural hinges attached to the levers are provided since the levers rotate slightly about their fulcrums. The aforementioned rigid beam is rigidly attached to the levers, so it also rotates slightly as it moves. This rotation is accommodated by flexural hinges at each end of the linear transducer.

BRIEF DESCRIPTION OF THE DRAWINGS

In the drawings, wherein like reference characters denote similar elements throughout the several views:

FIGS. 1A and 1B are front and side views, respectively of the presently preferred embodiment of the present invention;

FIG. 2 is an exploded view, in perspective of the embodiment shown in FIGS. 1A and 1B with the moving frame and flexural suspension portions being made from separate pieces;

FIG. 5 is a sectional view, taken along line 5—5 in FIG. 1A, of the presently preferred embodiment of the present invention.

DETAILED DESCRIPTION OF THE INVENTION

Figure 3:
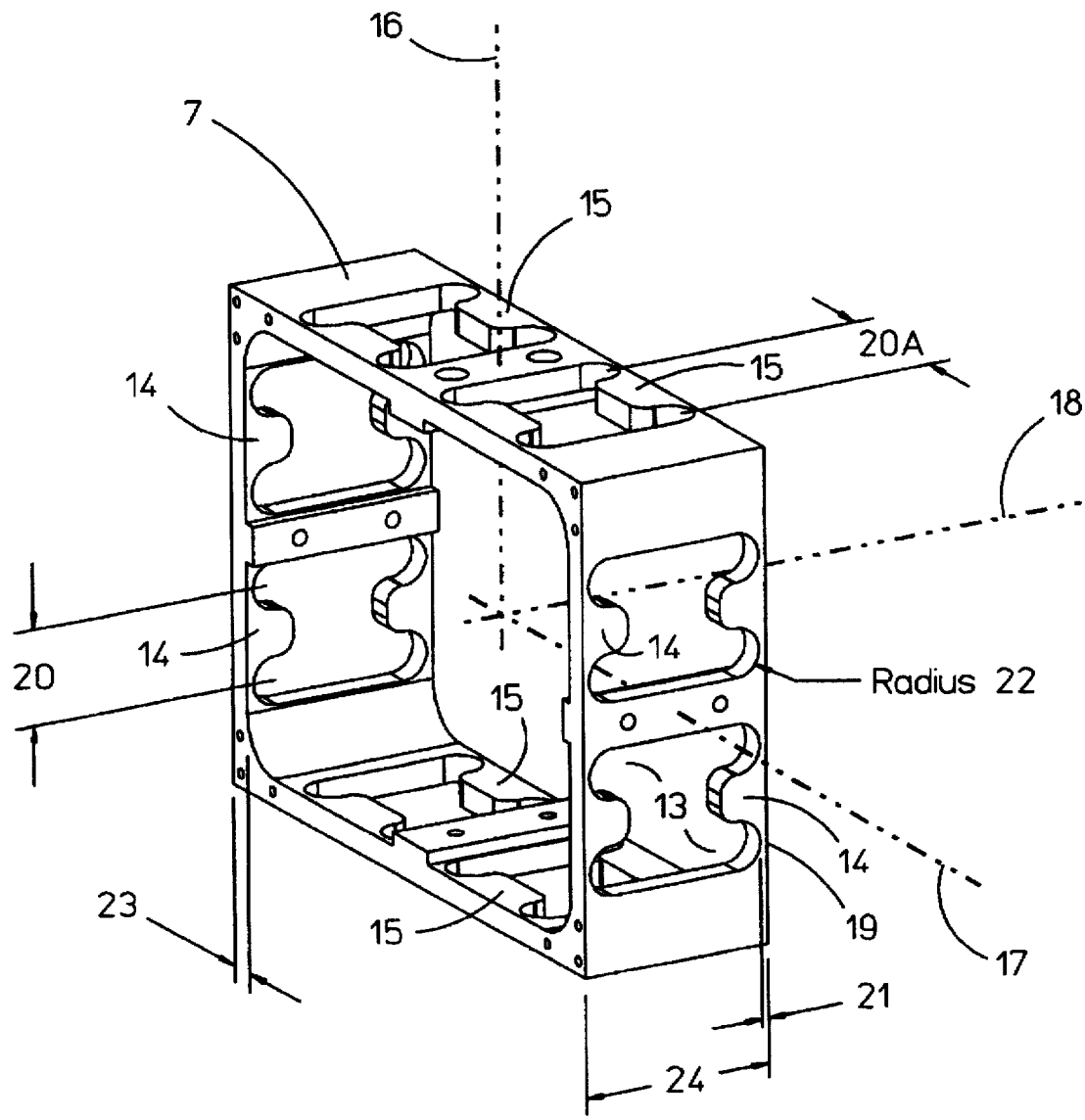
FIG. 3 is a perspective view of the flexural suspension portion of the embodiment shown in FIGS. 1A, 1B and 2.

Referring now to the drawings in detail, FIGS. 1A and 1B are front and side views, respectively, of a presently preferred embodiment of the present invention. FIG. 2 is an exploded view of the same embodiment. Preferably, a stationary, rigid, open rectangular base frame (2) incorporates one or more planar surfaces (3) and associated hole patterns (4) for mounting to an instrument or other apparatus (not shown). As shown and preferred, an alternate face (5) of base frame (2) contains four protruding coplanar surfaces (6) for attaching a flexural suspension (7), using machine screws (8). Flexural suspension (7) is preferably in the shape of an open rectangle. The four corners (9) of the flexural suspension (7) are preferably fixed to surfaces (6) of the base frame (2). A central portion (10) of each of the four sides of the flexural suspension (7) is preferably movable with respect to the four corners (9). As further shown and preferred in FIGS. 2 and 5, a moving frame (11) is rigidly attached to the four moving portions (10) of the flexural suspension (7). The object to be translated (12), which might be, for example, an optical element for use in a phase measuring interferometer (not shown) is preferably attached to the moving frame (11). Two dog-bone-shaped cutouts (13) preferably located in each side of the flexural suspension (7) create eight pairs of parallel flexural links (14) and (15), which join the four fixed corners (9) to the four moving portions (10). Four pairs of links (14) are preferably oriented vertically and four pairs of links (15) are preferably oriented horizontally. The vertical links (14) primarily serve to oppose the following motions of the moving frame (11): translation along a vertical axis (16); rotation about a horizontal axis (17); and rotation about a horizontal axis (18). The horizontal links (15) primarily serve to oppose the following motions of the moving frame (11): translation along a horizontal axis (17); rotation about a vertical axis (16); and rotation about a horizontal axis (18). Preferably all of the links (14) and (15) allow relatively unrestrained translation along the horizontal axis (18), which is the desired axis of translational motion of the this object (12). Links (14) and (15) allow this relatively unrestrained translation along horizontal axis (18) by bending primarily at relatively thin portions (19). Preferably, the compliance of the flexural suspension (7) along the axis of desired motion (18) must be sufficient to allow a long range of travel along that axis. At the same time, the stiffnesses for translation along the axes of undesired motion (16) and (17), and the stiffnesses for rotation about all three axes (16), (17), and (18), must preferably be maximized to contribute to a high resonant frequency for undesired modes of vibration of the moving element (12).

Referring now to FIG. 3, the compliance of the flexural suspension (7) for translation along the axis of desired motion (18), the stiffnesses for translation along the axes of undesired motion (16) and (17), and the stiffnesses for rotation about all three axes (16), (17), and (18), are preferably controlled by means of the following design variables: lengths (20) and (20A) of the flexural links (14) and (15), respectively; minimum thickness (21) of flexural portions (19); radius (22) of flexure cutouts (13); width (23) of flexural links (14) and (15); and overall thickness (24) of the flexural suspension (7); as well as the moduli of elasticity of the material from which flexural suspension (7) is fabricated.

The present invention provides considerable latitude for adjusting these design variables to achieve a range of translation in the tens of micrometers, and resonant frequencies in the hundreds of Hertz for a 1 kilogram optical element, for example. While the dog-bone shape of cutouts (13) is compatible with low-cost machining methods, such as milling, other shapes are possible, as long as the links (14) and (15) are preferably created in parallel pairs with relatively thin portions (19) at their ends.

Figure 4:
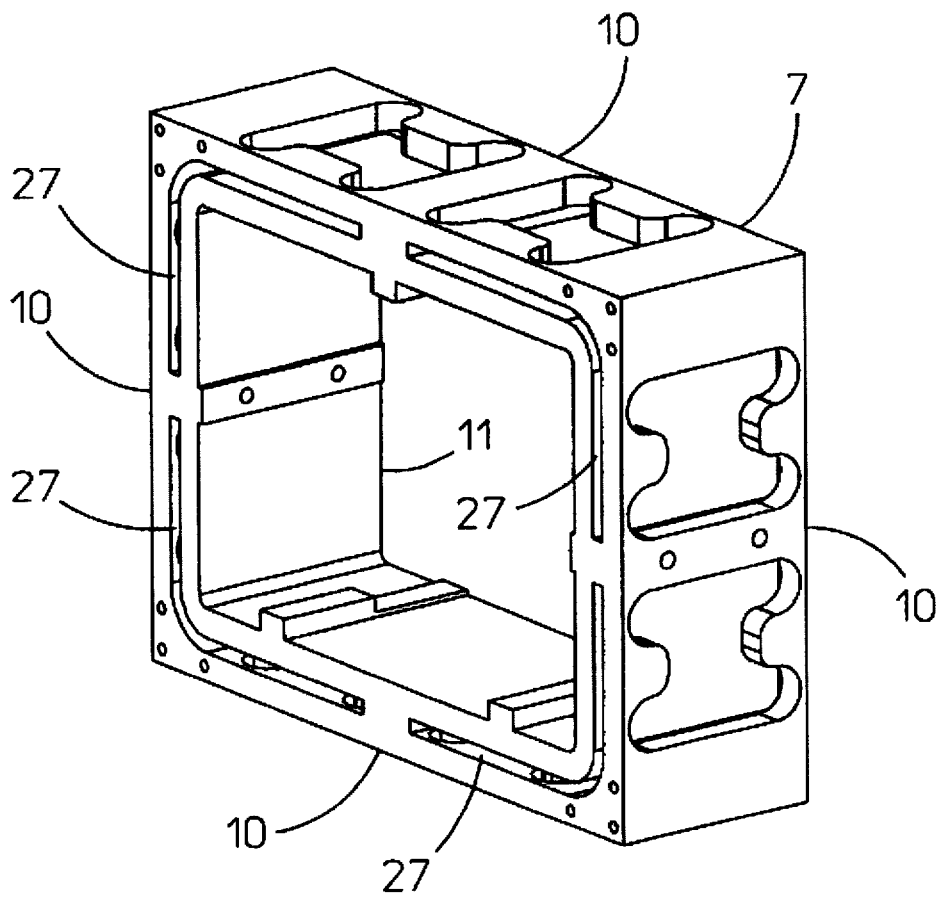
FIG. 4 is a perspective view of an alternative preferred embodiment of the flexural suspension portion of the embodiment shown in FIGS. 1A, 1B, 2 and 3 with the moving frame and flexural suspension being made from one piece of material.

Referring now to FIG. 2, the attachment of the four moving portions (10) of the flexural suspension (7) to the moving frame (11) can make use of machine screws (25) and raised mounting surfaces (26). Alternatively,if desired, in an alternative preferred embodiment, as shown in FIG. 4, the moving frame (11) and the flexural suspension (7) can be made from one piece of material using, for example, wire electrical discharge machining to form slots (27). In this alternative embodiment, slots (27) separate the moving frame (11)from the flexural suspension (7) everywhere except at the four moving portions (10), providing maximum rigidity between the moving frame (11) and moving portions (10) of the flexural suspension (7).

Referring once again to FIGS. 2 and 5, the moving frame (11) is preferably made suitably rigid to minimize relative motion between the four moving portions (10) of the flexural suspension (7) and the optical element or other moving object (12). In the case where the moving object (12) is an optical element or other object which, preferably, must not be deformed, the moving frame (11) preferably carries three kinematic or semi-kinematic mounting clamps (28). Each clamp (28) is preferably fixed to the moving frame (11) using, for example, screws (not shown), in such a way as to apply compressive force through resilient material (29), which might be silicone rubber or another elastomer commonly used in mounting optical elements, to the hold element (12) against three raised, coplanar, pads (30). The raised pads (30) are preferably machined portions of the moving frame (11). The optical element or other moving object (12) can be elliptical, rectangular, or other shape, provided the moving frame (11) is suitably configured to retain it.

Referring once again to FIGS. 1B, 2, and 5, a drive mechanism (31) preferably serves to convert the linear expansion (33) of transducer element (32) to the desired displacement (34) of the moving object (12). The drive mechanism (31) preferably includes baseplate (35), which is preferably attached rigidly, e.g., using machine screws (38), to the stationary base frame (2). Rigidly attached to the baseplate (35) are preferably the transducer fixed end anchor block (37) and lever fulcrum flexures (38). Also attached to the baseplate (35) are preferably transducer preload springs (39) using spring posts (40). The drive mechanism (31) also preferably includes the transducer assembly (41). The transducer assembly (41) preferably includes the transducer element (32), which may be, for example, a piezoelectric transducer or an electromagnetic voicecoil or solenoid, two transducer end flexures (42) and (43), the transducer fixed end anchor block (37), two transducer preload springs (39), and transducer electrical connection wires (44). Transducer element (32) expands or contracts in length (indicated by numeral 33) in response to an electrical signal (45) applied to the wires (44). The two springs (39) preferably provide a symmetric axial preload force on the transducer element (32), sufficient to keep it in a state of compressive stress. The end flexures (42) and (43) are bonded to the end faces of the transducer element (32) using adhesive (46), which may be, for example, an epoxy adhesive. The end flexures (42) and (43) serve to minimize the bending stresses on the transducer element (32) which would otherwise arise due to the rotational motion (48) of the beam (47), as it pivots about the fulcrum flexures (38). The beam (47) preferably conveys the translational displacement of the end flexure (43) to two levers (49), and is preferably designed for high beam stiffness to minimize bending in the horizontal plane. Because the point of connection of the transducer flexure (43) is preferably midway along the length of the beam (47) between the attachment points of the levers (49), the expansive force developed at the transducer element (32) is shared equally between the two levers (49), and no net torque is imposed upon the moving frame (11) about the vertical axis (16). This beam (47) also preferably provides attachment means for the transducer preload springs (39), by accommodating pins (50). The beam (47) is preferably rigidly attached to the two levers (49) at the latter's input ends (51). The levers (49) are preferably attached via fulcrum flexures (38) to the stationary baseplate (35), allowing them to rotate as indicated by numeral 48. The lower ends of these levers (49) are coupled to the moving frame (11) through output flexures (52) and spacers (53). The flexures (52) are presently preferred due to the rotational motion (48) of the levers (49). The theoretical ratio between the input motion, i.e., transducer expansion (33), and the output motion, i.e., optical element displacement (34), is determined by the ratio between the length of the levers (49) from the centerline of the transducer element (32) to the fulcrum flexure (38) and their length from the fulcrum flexure (38) to the output flexure (52). The actual motion ratio however, differs somewhat from this theoretical value due to the limited stiffness of the beam (47), the levers (49), and the baseplate (35), as well as the limited compliance of the flexures (19), (38), and (52).

By providing a micromotion translator in accordance with the present invention, various advantages may be obtained over the prior art known to applicant. Some of the principal advantages which may be obtained are: Long range of translation, high resonant frequency, and single actuator.

What is claimed is:

1. An apparatus for providing tilt-free, linear micromotion translation of an object relative to a fixed rigid frame member comprising:

parallelogram flexural suspension means connected to said object for enabling motion of said object along a predetermined translational axis while limiting the degrees of freedom of movement of said object about said axis, said parallelogram flexural suspension means comprising a plurality of flexural links connecting a plurality of points on said fixed rigid frame member to a plurality of points on a moving rigid frame member, said links and said points connected by said links lying in a pair of parallel planes with an arrangement of links and fixed and moving points being disposed in each of said parallel planes and with said translational axis being normal to said pair of parallel planes, said arrangements of said fixed and moving points being disposed in said parallel planes for minimizing any undesirable cross axis translational motion of said object for enabling parallel tilt free motion of said object along said axis, linear motion transducer means; and drive means coupling said linear motion transducer means to said parallelogram flexural suspension means without compromising said tilt-free, linear micromotion translation of said object.

2. An apparatus in accordance with claim 1 wherein said object comprises an optical element.

3. An apparatus in accordance with claim 1 wherein said arrangements of said links and said fixed and moving points in said parallel planes are identical.

4. An apparatus in accordance with claim 1 wherein said arrangement of links and fixed and moving points in one of said parallel planes comprises a rectangle having four sides and corners where said sides meet, four of said fixed points being disposed at the corner of said rectangle and four of said moving points being disposed at the midpoints of the four sides of said rectangle, said plurality of flexural links comprising four pairs of said flexural links disposed so that each pair joins one of said moving points to its two neighboring fixed points to form one of said sides of said rectangle.

5. An apparatus in accordance with claim 4 wherein each of said flexural links comprises a rigid beam with a flexural hinge joint at each end for enabling relatively unrestricted motion normal to said link while essentially preventing motion parallel to the length of said link.

6. An apparatus in accordance with claim 1 wherein each of said flexural links comprises a rigid beam with a flexural hinge joint at each end for enabling relatively unrestricted motion normal to said link while essentially preventing motion parallel to the length of said link.

7. An apparatus in accordance with claim 1 wherein said drive means comprises means for controlling the position of said object along said translational axis.

8. An apparatus in accordance with claim 7 wherein said drive means further comprises means for converting any elongation of said linear motion transducer means into two equal motions driving said object at two locations symmetrically arranged about its geometric center.

9. An apparatus in accordance with claim 7 wherein said drive means further comprises means for converting any elongation of said linear motion transducer means into two equal motions driving said object at two locations symmetrically arranged about its center of mass.

10. An apparatus in accordance with claim 7 wherein said drive means position controlling means comprises a rigid beam, said transducer means acting at a center point of said rigid beam for causing said entire beam to translate in a direction perpendicular to its length.

11. An apparatus in accordance with claim 10 wherein said beam has two ends, said position controlling means further comprising two levers, said beam ends being attached to said levers, each lever being attached to a fixed fulcrum point by means of a flexural hinge located part way along the length of the lever, the opposite end of each lever being attached to a moving point of the flexural suspension by an additional flexural hinge.

12. An apparatus in accordance with claim 11 wherein four flexural hinges are attached to the levers for controlling rotation of the levers about their fulcrums, said rigid beam being rigidly attached to the levers for enabling rotation as it moves, said rotation being accommodated by flexural hinges disposed at each end of said transducer means.

13. An apparatus in accordance with claim 1 wherein said linear motion transducer means comprises a single transducer.

14. An apparatus in accordance with claim 1 wherein said linear motion transducer means compresses a piezoelectric transducer.

15. An apparatus in accordance with claim 1 wherein said linear motion transducer means comprises an electromagnetic voice coil.

16. An apparatus in accordance with claim 1 wherein said linear motion transducer means comprises a solenoid.

* * * * *